C. G. KELLER.
WRENCH.
APPLICATION FILED APR. 18, 1917.
1,265,341. Patented May 7, 1918.
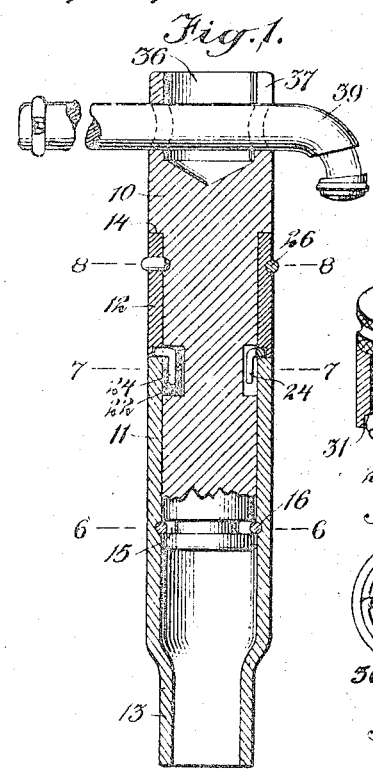
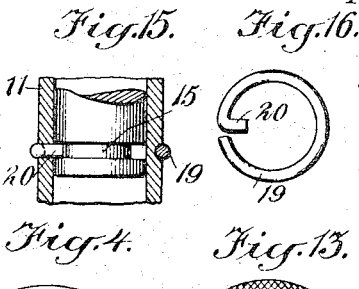
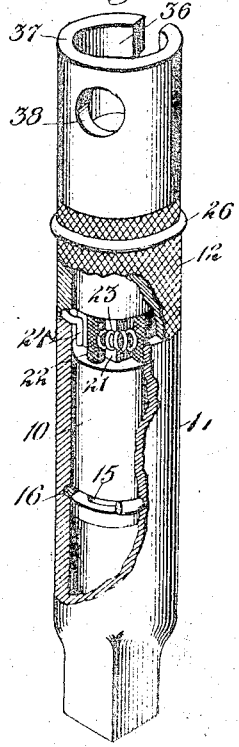
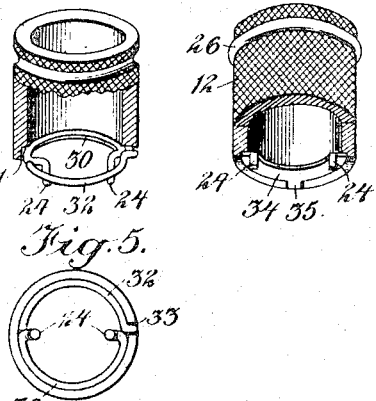
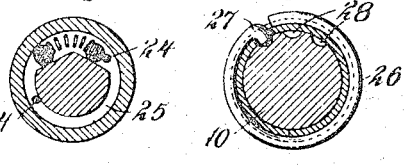
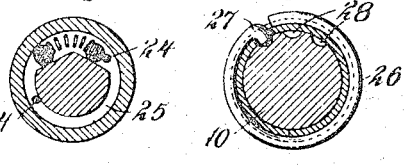
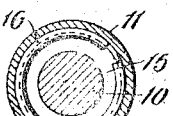
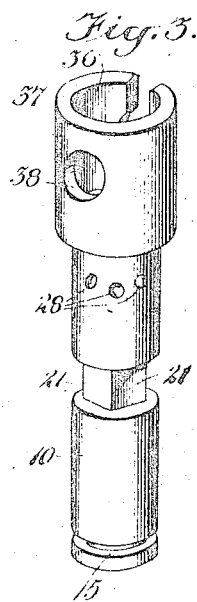
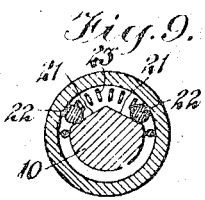
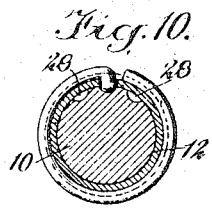
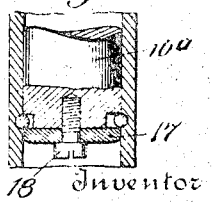
Inventor
Charles G. Keller
By his Attorney

UNITED STATES PATENT OFFICE.

CHARLES G. KELLER, OF POUGHKEEPSIE, NEW YORK.

WRENCH.

1,265,341.   Specification of Letters Patent.   Patented May 7, 1918.

Application filed April 18, 1917. Serial No. 162,842.

*To all whom it may concern:*

Be it known that I, CHARLES G. KELLER, a citizen of the United States, and a resident of Poughkeepsie, in the county of Dutchess and State of New York, have invented certain new and useful Improvements in Wrenches, of which the following is a specification.

This invention relates to certain improvements in wrenches of the reversible friction roll type in which the handle member and work engaging parts are coaxially and relatively rotatable.

The main object of my invention is to so design the parts, necessary to produce the desired results, that they may be materially reduced in number and cost of manufacture. Each part is of such shape that it may be formed by a simple stamping or bending operation or by a minimum amount of simple machine work.

Further objects of my invention are to provide a simpler, more efficient and less expensive friction gripping mechanism between the relatively rotatable parts and a simpler, more efficient and less expensive shifting mechanism for controlling the rollers of the friction gripping mechanism.

Although my invention is primarily adapted for use in and as a part of a socket wrench, yet it will of course be evident that certain features of my invention might have equal applicability to other forms of turning devices or to other mechanisms wherein it is desired to impart intermittent rotation in either direction to one part by the oscillation of another. It will therefore be evident that the specific embodiments of my invention which I have illustrated in the accompanying drawings may be varied within the scope of the appended claims without departing from the spirit of my invention.

In these drawings, to which reference is to be had, and in which similar reference characters indicate corresponding parts in the several views, Figure 1 is a central longitudinal section through a socket wrench embodying my invention;

Fig. 2 is a perspective view, a portion of the socket sleeve and shifting sleeve being broken away;

Fig. 3 is a perspective view of the wrench head;

Fig. 4 is a perspective view of the shifting sleeve, a portion of the latter being broken away;

Fig. 5 is a lower end view of the parts shown in Fig. 4;

Fig. 6 is a transverse section on the line 6—6 of Fig. 1;

Fig. 7 is a transverse section on the line 7—7 of Fig. 1 and showing the parts in position for clockwise rotation of the socket sleeve;

Fig. 8 is a transverse section on the line 8—8 of Fig. 1 and showing the position of the shifting sleeve when the rollers are in the position shown in Fig. 7;

Figs. 9 and 10 are sections similar to Figs. 7 and 8 but showing the parts in position for positive rotation in either direction;

Figs. 11 and 12 are sections corresponding to Figs. 7 and 8, but showing the parts in position for counter-clockwise rotation of the socket sleeve;

Fig. 13 is a perspective view similar to Fig. 4 but showing a modified form of roller shifting fork;

Figs. 14 and 15 are sections similar to a portion of Fig. 1 but showing other forms of locks; and Fig. 16 is a plan view of the locking ring shown in Fig. 15.

My improved constructions includes two main, concentric, relatively rotatable parts held against relative longitudinal movement and provided with shiftable friction rollers whereby rotation in either or both directions may be imparted to one upon the oscillation of the other. My invention resides in the form, shape and details of construction of these parts and the connecting and operating means.

As illustrated, a wrench head 10 is formed from a single piece of metal bar, one end portion of which is mainly cylindrical and encircled by a socket sleeve 11 and a roller shifting sleeve 12. These sleeves may be made of sections of metal tubing and may be of the same diameter and abut against each other. The socket sleeve projects beyond the end of the wrench head and terminates in or is connected to a work engaging part 13. This part is shown as a squared end on the socket sleeve so as to form a socket into which the nut, tool, or other part to be turned, hereinafter designated as the work, may be received. Any other suitable form of work engaging part might be employed.

The roller shifting sleeve 12 is shown as abutting against a shoulder 14 at the end of the reduced portion of the head and of a thickness substantially equal to the width of said shoulder so that the external diameters of the upper end of the head, the roller shifting sleeve and the socket sleeve, are substantially the same.

The roller shifting sleeve is held in position by the socket sleeve and the latter may be held against longitudinal movement by any suitable interengaging part or parts which will permit the free rotation of the socket sleeve and wrench head.

As illustrated in Figs. 1 and 6, the wrench head has an annular groove 15 into which a split ring 16 may be compressed while the wrench head and socket sleeve are being telescoped. When the parts reach final position, the split ring may expand into a groove in the inner surface of the socket sleeve and act as an effective permanent lock. Instead of using the split ring, other forms of locks may be employed which will permit the separation of the parts. In Fig. 14, I have shown the lower end of the wrench head 10ª in the form of a washer 17 held in place by a screw 18. The removal of this screw and washer permits access to and the disassembling of the wrench.

In Figs. 15 and 16, I have shown a locking ring 19 encircling the socket sleeve and disposed in an annular groove in the outer surface of the latter. The ring is formed of one piece of wire with one end 20 bent to project through a hole in the wall of the sleeve into the annular groove 15 in the lower end of the wrench head. A common set screw might be employed in place of the locking rings shown although the construction shown in Figs. 15 and 16 has the advantage of avoiding the necessity of threading any parts and still permitting their separation when desired.

To provide a receiving chamber and operating surfaces for the gripping rollers, a portion of the wrench head adjacent to and substantially within the socket sleeve 11 is cut away to provide a recess, preferably including two intersecting segmental recesses defined in part by two intersecting plane surfaces 21. These surfaces may be at various different angles in respect to each other and even including a straight angle. The end walls of these recesses are formed by the body of the adjacent portions of the wrench head which are not cut away and within the space thus formed are two rollers 22, preferably hardened by heat-treatment and knurled or roughened.

The rollers are of less diameter than the maximum depth of the two intersecting segmental recesses and are normally spread apart by a coil spring 23 which engages with both and forces both into the angles between the opposite ends of the surfaces 21 and the inner surface of the concentric socket sleeve 11. The size of the rollers and the angle of these surfaces are such that when both rollers are forced into their respective angles, as shown in Fig. 9, neither the socket sleeve nor the wrench head can be rotated in respect to the other.

For controlling the position and operation of these rollers, I employ the roller shifting sleeve 12 and a roller engaging fork carried thereby. As previously stated, the roller shifting sleeve preferably abuts against the end of the socket shifting sleeve and the roller receiving recesses are adjacent to the end of the socket sleeve.

The roller shifting sleeve carries a fork having two depending tines or prongs 24 at approximately diametrically opposite points and extending axially to positions alongside of the rollers. The roller receiving recesses in the wrench head are of such size that they may receive said prongs or tines, or the head may be additionally cut away to receive them. As shown, the portion of the head which is cut away to form the roller receiving recesses is also turned down to form an annular groove 25, within which these prongs may move. The prongs are so positioned in respect to each other that when the shifting sleeve is in a central position, both prongs are out of engagement with their respective rollers as is shown in Fig. 9.

By rotating the shifting sleeve in one direction, for instance counter-clockwise, one of the prongs will engage with one roller and hold it out of the angle of its recess, while permitting the other roller to operate, as shown in Fig. 7. By rotating the roller shifting sleeve in the opposite direction, for instance clockwise, the other prong will engage with its roller and hold the latter out of operation while the other roller is permitted to operate, as is indicated in Fig. 11.

For determining the position of the shifting sleeve and for insuring its retention in the desired shifted position, I may provide the shifting sleeve with an encircling spring ring 26 lying in a groove in the outer surface of the shifting sleeve. This spring ring may have a rounded inturned end 27 terminating just inside of the inner surface of the shifting sleeve and adapted to enter any one of a series of three sockets 28 in the head. The shifting sleeve is preferably knurled or roughened on its exterior surface and of a substantial length so that it may be readily grasped to rotate it from one to another of its three positions, and the spring ring 26 is of such strength that it will ride over from one socket to the next but will hold the shifting sleeve in position when the latter is released.

The prongs or tines 24 may be secured to the shifting sleeve 12 in various different ways. One very simple form is illustrated in Figs. 1 and 4. The two prongs are here shown as the depending parallel ends of a wire 30, the body portion of which is bent to semi-circular form and disposed within a groove or recess 31 in the inner surface of the shifting sleeve at the lower end of the latter. For preventing the wire and its prongs from relative rotation in respect to the shifting sleeve, I have shown a second wire 32 which also has its body portion bent to semi-circular form and lying in the same groove, but it has one end abutting against the wire 30 and the opposite end bent out to lie partly in an aperture 33 through the wall, or a recess in the wall, of the sleeve 12 and partly abutting against the wire 30, as shown in Fig. 5.

Another simple form is illustrated in Fig. 13. Here, the prongs or tines 24 are integral with a semi-circular sheet metal plate 34 which lies in a shallow groove in the end of the shifting sleeve and has a prong 35 engaging in a socket or recess so as to prevent relative rotation of the plate 34 and the shifting sleeve 12.

For rotating the wrench head 10, any suitable means may be employed. I have shown the end of the head provided with a socket or hole 36 extending axially thereinto and encircled by an annular flange 37. This flange has diametrically opposite apertures 38 therethrough, one of which opens to the end of the flange by a slot narrower than the apertures 38. A handle member 39 engages in the apertures to facilitate the rotation of the wrench head.

This handle is preferably formed of a bar bent at one end to facilitate the bringing of the handle to a position parallel with the body of the wrench. At its ends, it has means for preventing the rod from becoming detached. Preferably, the bar has annular grooves turned therein adjacent to each end and into which spring rings may be snapped to form stops larger than the apertures 38. To permit the rod to be moved in the flange 37, it may be turned down at a point adjacent to one end and before the handle member is bent to the form shown in Fig. 1.

In view of the illustration and the foregoing description, it is not thought that a detailed description of the operation is necessary. It will be apparent that the roller shifting sleeve 12 may be rotated to bring its roller engaging prongs into any one of the three positions shown in Figs. 7, 9 and 11, and will be retained in that position by the operation of the parts shown in Figs. 8, 10 and 12. When the parts are in the position shown in Figs. 7 and 8, the rotation of the wrench head in a clock-wise direction will compel a corresponding rotation of the socket sleeve, while a rotation of the wrench head in the opposite direction will permit the socket sleeve to remain stationary. With the parts in the position shown in Figs. 9 and 10, any rotation of the wrench head in either direction will rotate the socket sleeve, while with the parts in the position shown in Figs. 11 and 12, the wrench head may be coupled to the socket sleeve when rotated in a counter-clockwise direction but not in the opposite direction. It will be noted that all of the surfaces of the wrench head are turned with the exception of the two flat intersecting surfaces 21 and the slot for the handle, which may be readily machined. All parts of the two sleeves which engage with the wrench head are either turned, drilled, milled or pressed, and the roller shifting prongs may be readily stamped or bent from inexpensive stock. The entire wrench is formed of a very small number of parts, inexpensive to manufacture and easy to assemble.

Having thus described my invention, what I claim as new and desire to secure by Letters Patent is:

1. In combination, a solid bar having a cylindrical portion of reduced diameter at one end terminating in an annular shoulder and a recess in the periphery of said reduced portion, a sleeve encircling said reduced portion and recess and held against longitudinal movement in respect thereto, one end of said sleeve having a socket to receive a nut to be rotated, a roller within said recess and adapted to grip the inner surface of said sleeve adjacent one end of the recess, a roller shifting collar encircling said reduced portion and held against endwise movement by the end of said sleeve and said shoulder, and means carried by said collar for holding said roller away from the end of said recess and out of gripping position.

2. A wrench including a wrench head in the form of a solid bar having a recess in the peripheral wall thereof, a socket sleeve encircling one end of said head and held against endwise movement in respect thereto, a handle secured to the opposite end of said head, a roller within said recess and adapted to grip the inner surface of the sleeve adjacent one end of the recess, and means for holding said roller in operative or inoperative position.

3. A wrench including a wrench head formed of a metal bar having a portion of reduced diameter and a recess in the periphery intermediate of the ends of said reduced portion, a socket sleeve having one end encircling the free end of said reduced portion and the recess of the latter, and held against endwise movement, a handle at the opposite or larger end of said wrench head, a roller within said recess, and a roller shifting sleeve also encircling the reduced portion of said wrench head at the end of said socket sleeve.

4. A wrench including two concentric relatively rotatable members held against relative longitudinal movement one constituting a wrench head and the other a socket member, the inner member having a recess in the periphery thereof presenting two intersecting faces, a roller between each face and the inner surface of the outer member, and means for holding either roller out of gripping engagement between the converging surfaces of its corresponding recess face and the outer member.

5. A wrench including two concentric relatively rotatable members one constituting a wrench head and the other a socket member, the inner member having a recess presenting surfaces converging toward the wall of the outer member in opposite directions, two separate rollers within said recess, a spring for pressing said rollers apart toward the opposite ends of said recess, and means for holding either roller out of gripping engagement with the converging walls of the recess and outer member.

6. A wrench including two concentric relatively rotatable members one constituting a wrench head and the other a socket member, the inner member having a recess presenting two surfaces at an angle to each other and each converging toward the inner surface of the outer member in opposite directions, two separate rollers within said recess, and means for holding either of said rollers in operative position.

7. A wrench including two concentric members one constituting a wrench head and the other a socket member, the inner member having a recess encircled by the outer member, a pair of rollers within said recess, resilient means normally tending to separate said rollers to the limiting extent and hold each in frictional engagement with the inner surface of the outer member, and a surface of the recess, and means for holding either of said rollers in non-gripping position.

8. A wrench including two concentric members, the inner member having a recess encircled by the outer member, a pair of rollers within said recess, resilient means normally tending to separate said rollers to the limiting extent and hold each in frictional engagement with the inner surface of the outer member, and a surface of the recess, and a roller shifting device including a pair of projections extending in an axial direction and one serving to move one of said rollers into non-gripping position and the other serving to move the other of said rollers into non-gripping position.

9. A wrench including two concentric members, the inner member having a recess encircled by the outer member, a pair of rollers within said recess, resilient means normally tending to separate said rollers to the limiting extent and hold each in frictional engagement with the inner surface of the outer member and a surface of the recess, a roller shifting device including a pair of projections extending in an axial direction and one serving to move one of said rollers into non-gripping position and the other serving to move the other of said rollers into non-gripping position, and means connecting said projections for permitting their alternate but not simultaneous operation.

10. A wrench including two concentric members, the inner member having a recess encircled by the outer member, a pair of rollers within said recess, resilient means normally tending to separate said rollers to the limiting extent and hold each in frictional engagement with the inner surface of the outer member and a surface of the recess, and a roller shifting sleeve encircling the inner member at the end of the outer member and having a pair of roller shifting projections extending axially within the outer member for operative engagement with said rollers.

11. A wrench including a wrench head formed of a metal bar and provided with a recess in the periphery thereof, a handle directly connected with said wrench head for rotating the latter, a roller shifting sleeve encircling said head intermediate of the ends thereof, a socket sleeve encircling one end portion of said head and substantially covering said recess and abutting against said roller shifting sleeve, a pair of rollers in said recess, a spring intermediate of said rollers and pressing them toward opposite ends of said recess, and a pair of prongs carried by said roller shifting sleeve and disposed upon opposite sides of said rollers, whereby upon the rotation of said roller shifting sleeve in one direction, one of said rollers may be moved to inoperative position and by a rotation in the opposite direction, the other roller may be moved to inoperative position.

12. A wrench including two concentric members one constituting a wrench head and the other a socket member, the inner member having a recess substantially covered by the outer member, a pair of rollers within said recess, a spring for pressing them apart into operative engagement with said members adjacent to opposite ends of said recess, and a roller shifting member having a pair of projections upon opposite sides of said pair of rollers and rotatable in respect to the inner member whereby both of said rollers may operate to grip said members together when said shifting member is in neutral position and either of said members may be moved to inoperative position by a rotation of said shifting member in one direction to disengage one roller and in the other direction to disengage the other.

13. A wrench including two concentric members one constituting a wrench head and the other a socket member, one of said members having a recess substantially covered by the other member, a pair of rollers within said recess, a sleeve encircling the inner member and having a pair of roller shifting prongs formed from bent metal and disposed upon opposite sides of said pair of rollers, and means for holding said sleeve in any one of three rotative positions to permit operation of either or both of said rollers.

Signed at Poughkeepsie in the county of Dutchess and State of New York this 16th day of April, A. D. 1917.

CHARLES G. KELLER.